US009675958B2

(12) United States Patent
Kang et al.

(10) Patent No.: US 9,675,958 B2
(45) Date of Patent: Jun. 13, 2017

(54) METAL-ORGANIC FRAMEWORK COMPOSITE WITH NANO METAL-ORGANIC FRAMEWORKS EMBEDDED IN HOST METAL-ORGANIC FRAMEWORK, METHOD FOR PRODUCING THE METAL-ORGANIC FRAMEWORK COMPOSITE AND GAS STORAGE INCLUDING THE METAL-ORGANIC FRAMEWORK COMPOSITE

(71) Applicant: Korea Advanced Institute of Science and Technology, Daejeon (KR)

(72) Inventors: Jeung Ku Kang, Daejeon (KR); Kyung Min Choi, Daejeon (KR); Jung Hyo Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/009,074

(22) Filed: Jan. 28, 2016

(65) Prior Publication Data
US 2017/0072383 A1    Mar. 16, 2017

(30) Foreign Application Priority Data
Sep. 15, 2015    (KR) ........................ 10-2015-0130343

(51) Int. Cl.
*B01D 53/04*    (2006.01)
*B01J 20/22*    (2006.01)
*B01J 20/28*    (2006.01)

(52) U.S. Cl.
CPC ............ *B01J 20/226* (2013.01); *B01D 53/04* (2013.01); *B01J 20/2808* (2013.01);
(Continued)

(58) Field of Classification Search
CPC .. B01D 53/04; B01D 2253/204; B01J 20/226; B01J 20/28016; B01J 20/28066; B01J 20/2808; B01J 20/28026
(Continued)

(56) References Cited

U.S. PATENT DOCUMENTS

| | | | |
|---|---|---|---|
| 2006/0264324 A1* | 11/2006 | Schuth | C01B 3/0078 502/400 |
| 2012/0152845 A1* | 6/2012 | LeVan | B01D 53/02 210/660 |

(Continued)

FOREIGN PATENT DOCUMENTS

KR    1009676310000    6/2010

OTHER PUBLICATIONS

Rowsell, J. et al., "Hydrogen Sorption In Functionalized Metal-Organic Frameworks," J. Am. Chem. Soc. 2004, 126, 5660-5667.
(Continued)

*Primary Examiner* — Frank Lawrence
(74) *Attorney, Agent, or Firm* — Duane Morris LLP; J. Rodman Steele, Jr.; Gregory M. Lefkowitz (57) ABSTRACT

Disclosed is a metal-organic framework composite including a host metal-organic framework, and nano metal-organic frameworks embedded in the host metal-organic framework. The host metal-organic framework and the nana metal-organic frameworks include different metals and organic ligands. The metal-organic framework composite has a structure in which the nano metal-organic frameworks are embedded in the host metal-organic framework. Due to this structure, defects are formed at the interfaces between the host metal-organic framework and the nano metal-organic frameworks, enabling the application of the metal-organic framework composite to gas storages with greatly improved gas storage efficiency. The metal-organic framework com-
(Continued)

posite can be used as a gas adsorbent with very high efficiency due to its very large specific surface area. Also disclosed are a method for producing the metal-organic framework composite and a gas storage using the metal-organic framework composite.

17 Claims, 9 Drawing Sheets

(52) U.S. Cl.
CPC ... *B01J 20/28016* (2013.01); *B01J 20/28026* (2013.01); *B01J 20/28066* (2013.01); *B01D 2253/204* (2013.01); *B01D 2259/4525* (2013.01)

(58) Field of Classification Search
USPC .......................... 96/108, 153; 502/400, 401
See application file for complete search history.

(56) References Cited

U.S. PATENT DOCUMENTS

| | | | |
|---|---|---|---|
| 2013/0157837 A1* | 6/2013 | Banerjee | B01J 20/226 502/5 |
| 2014/0018238 A1* | 1/2014 | Bajaj | B01J 20/20 502/401 |

OTHER PUBLICATIONS

Dau, P., et al., "Functional group effects on metal-organic framework topology," Chem. Commun., 2012, 48, 9370-9372.
Koh, K., et al., "MOF@MOF microporous core-shell architectures:" Chem. Commun., 2009, 6162-6164.
Park, J., et al., "In-situ observation for orowth of hierarchical metel-organic frameworks and their self-sequestering mechanism for gas storage," Sci. Rep. 5, 12045; doi: 10.1038/srep12045 (2015).
Foo, et al., "Functional Hybrid Porous Coordination Polymers," Chem Mater., 2014, 26, 310-322.

* cited by examiner

METAL-ORGANIC FRAMEWORK COMPOSITE WITH NANO METAL-ORGANIC FRAMEWORKS EMBEDDED IN HOST METAL-ORGANIC FRAMEWORK, METHOD FOR PRODUCING THE METAL-ORGANIC FRAMEWORK COMPOSITE AND GAS STORAGE INCLUDING THE METAL-ORGANIC FRAMEWORK COMPOSITE

CROSS-REFERENCE TO RELATED APPLICATIONS

This application claims priority under 35 U.S.C. §119 to Korean Patent Application No. 10-2015-0130343 filed on Sep. 15, 2015 in the Korean Intellectual Property Office, the disclosure of which is incorporated herein by reference is its entirety.

BACKGROUND OF THE INVENTION

1. Field of the Invention

The present invention relates to a metal-organic framework composite including a host metal-organic framework and nano metal-organic frameworks embedded in the host metal-organic framework, a method for producing the metal-organic framework composite, and a gas storage using the metal-organic framework composite. More particularly, the present invention relates to the use of a host metal-organic framework and nano metal-organic frameworks including different metals and organic ligands, the production of a metal-organic framework composite in which the nano metal-organic frameworks are embedded in the host metal-organic framework, and the application of the metal-organic framework composite to a gas storage.

2. Description of the Related Art

Metal-organic frameworks were first reported by Omar M. Yaghi, a professor of the University of California, Berkeley (USA) (Non-patent Document 1). Metal-organic frameworks are synthesized from metal precursors and organic ligands as linkers in a particular solvent by a hydrothermal method and have a three-dimensional porous structure in which the metal blocks and the organic ligands are repeatedly arranged. Metal-organic frameworks have a very large specific surface area due to the presence of micropores or mesopores. Metal-organic frameworks have received attention as materials for gas storage disc to their large specific surface area. Another advantage of metal-organic frameworks is that metal precursors can be very freely combined with organic ligands. Due to these advantages, thousands of metal-organic frameworks have been registered in the database so far.

Metal-organic frameworks were synthesized using a single metal and a single organic ligand in the early days (Patent Document 1). Since then, methods have been reported for the synthesis of various organic ligands to adjust the pore size of metal-organic frameworks. There have also been a number of reports on methods for the synthesis of metal-organic frameworks suitable for the manufacture of more effective gas storages by mixing many metals with different organic ligands.

Furthermore, a metal-organic framework having a functionalized organic ligand capable of promoting a catalytic reaction was synthesized (Non-patent Document 2). The functionalization of the organic ligand can maximize the catalytic reaction because pores of the metal-organic framework are used as active sites.

Methods for synthesizing core/shell structured metal-organic frame-works were proposed (Non-patent Document 3). The core and shell parts are made of the same metal and the organic ligands have the same size in order to maintain the lattices of metal-organic frameworks. Such synthetic methods are designed such that metal-organic frameworks can more efficiently store gases, such as hydrogen, carbon dioxide, and methane, further improvements are still needed.

Initial research on the synthesis of metal-organic frameworks has been directed to increasing the efficiency of metal-organic frameworks based on the use of new metals and organic ligands and further research has been conducted on the mechanism of gas storage for higher efficiency, leading to a better understanding of the mechanism of gas storage. Based on this research, the synthesis of structures in which micropores and mesopores coexist was reported (Non-patent Document 4). The coexistence of micropores and mesopores allows gas molecules to easily enter through the mesopore regions, enabling gas storage. However, the smaller micropores block the escape of the gas molecules in the larger mesopores ("self-sequestering").

Metal-organic frameworks have very high capacities for gas storage. However, physisorption to pores having a large specific surface area limits practical applications of metal-organic frameworks to gas storages. To overcome this limitation, there is a need for a new synthetic method for metal-organic frameworks and a new gas storage mechanism.

The present inventors have found that when a host metal-organic framework and nano metal-organic frameworks including different metals and organic ligands are used, a metal-organic framework composite can be produced in which the nano metal-organic frameworks are embedded in the host metal-organic framework. The present inventors have also found that the metal-organic framework composite can be applied to gas storages with greatly improved gas storage efficiency. The present invention has been accomplished based on these findings.

PRIOR ART DOCUMENTS

Patent Documents

Patent Document 1: Korean Patent No. 10-0967631

Non-patent Documents

Non-patent Document 1: Yaghi, O. M. et al., *J. Am. Chew. Soc.*, 136, 5666-5667 (2004)
Non-patent Document 2: P. Dau et al., *chem commun.*, 48, 9370-9372 (2012)
Non-patent Document 3: K. Koh et al., *chem common.*, 41, 6162-6164 (2009)
Non-patent Document 4: Jung H, Park et al., *Sci. Rep.* 5, 12045 (2015)

SUMMARY OF THE INTENTION

The present invention has been made in view of the above problems, and it is an object of the present invention to provide a metal-organic framework composite in which nano metal-organic frameworks are embedded in a host metal-organic framework including a metal and a ligand different from those included in the nano metal-organic frameworks, and a method for producing the metal-organic framework composite.

An aspect of the present invention provides a metal-organic framework composite including a host metal-organic framework and nano metal-organic frameworks embedded in the host metal-organic framework, the host metal-organic framework, and the nano metal-organic frameworks being represented by Formulae 1 and 2, respectively:

$$M1_{x1}O_{z1}(L1G1)_{y1} \quad (1)$$

$$M2_{x2}O_{z2}(L1G2)_{y2} \quad (2)$$

wherein M1 and M2 are different from each other and are each independently selected from copper (Cu), iron (Fe), chromium (Cr), zinc (Zn), aluminum (Al), magnesium (Mg), nickel (Ni), europium (Eu), gadolinium (Gd), and terbium (Tb), L1G1 and L1G2 are different from each other and are each independently selected from 1,4-benzenedicarboxylate (BDC), 1,3,5-benzenetricarboxylate (BTC), 4,4',4"-benzene-1,3,5-triyl-tribenzoate (BTB), 4,4,4"-(benzene-1,3,5-triyl-tris(benzene-4,1-diyl))tribenzoate) (BBC), 4,4',4"-(benzene-1,3,5-triyl-tris(ethyne-2,1-diyl))tribenzoate (BTE), 5,5',5"-((((benzene-1,3,5-triyltris(benzene-4,1-diyl)tris(ethyne-2,1-diyl))-tris(benzene-4,1-diyl))tris(ethyne-2,1-diyl))triisophthalate (BHEHPI), 4,4',4"-1,3,5-triazine-2,4,6-triyl)tribenzoate (TATB), 5,5',5"-((benzene-1,3,5-tricarbonyl)tris(azanediyl))triisophthalate (TPBTM), 4,4',4"-(benzene-1,3,5-triyl)tris(pyrazol-1-ide) (BTP), 5,5',5"-(benzene-1,3,5-triyl-tris(ethyne-2,1-diyl))triisophthaiate (BTEI), 5,5',5"-(benzene-1,3,5-triyl-tris(biphenyl-4,4'-diyl))triisophthalate (BTTI), 5,5',5"-(((benzene-1,3,5-triyl-tris(ethyne-2,1-diyl))tris(benzene-4,1-diyl))tris(ethyne-2,1-diyl))triisophthalate (TTEI), 5',5"'',5"'''-(benzene-1,3,5-triyl-tris(ethyne-2,1-diyl))tris(([1,1':3',1"-tarphenyl]-4,4"-dicarboxylate)) (BTETCA), 5,5',5"-(((benzene-1,3,5-triyl-tris(ethyne-2,1-diyl))tris(benzene-4,1-diyl-tris(buta-1,3-diyne-4,1-diyl))triisophthalate (BNETPI), 5,5',5"-(benzene-1,3,5-triyl-tris(buta-1,3-diyl-4,1-diyl))triisophthalate (BHEI), dioxidoterephthalate (DOT), adamantane-1,3,5,7-tetracarboxylate (ATC), 6,6'-dichloro-4,4-di(pyridin-4-yl)-[1,1'-binaphthalene]-2,2'-diol (DCDPBN), imidazole dicarboxylate (ImDC), 4,4'-([2,2'-bipyridine]-5,5'-diyl) dibennzoate (DPBPyDC), 2-phenylpyridine (PPy), 2,4,6-trihydroxy-1,3,5-benzenetrisulfonate (THBTS), 3,3',5,5'-azobenzenetetracarboxylate (ADB), and 4,4'-(2,5,8,11,14,16,19,22,25,28-decaoxa-1,15(1,4)-dibenzacyclooctacosaphane-1$^2$,1$^5$-diylbis(ethyne-2,1-diyl)) dibenzoate (BPP34C10DA), x1 is an integer from 1 to 6, x2 is an integer from 1 to 6, z1 is an integer from 1 to 4, z2 is an integer from 1 to 4, y1 is an integer from 1 to 6, and y2 is an integer from 1 to 6.

In Formulae 1 and 2, M1 is Zn, L1G1 is BDC, M2 is Cu, L1G2 is BTC, x1 is 4, z1 is 1, y1 is 3, x2 is 3, z2 is 0, and y2 is 2.

The nano metal-organic frameworks have a size of 5 to 300 nm.

The nano metal-organic frameworks have a pore size of 5 to 7 Å and the host metal-organic framework has a pore size of 8 to 10 Å.

The nano metal-organic frameworks have a BET specific surface area of 1370 to 1570 m$^2$/g and the metal-organic framework composite has a BET specific surface area of 3300 to 3500 m$^2$/g.

L1G1 and L1G2 are in a molar ratio of 9-10:1.

The present invention also provides a gas storage including the metal-organic framework composite.

The present invention also provides a methane storage including the metal-organic framework composite.

The present invention also provides a dye-captured metal-organic framework composite including (i) the metal-organic framework composite and (ii) a dye captured in the nano metal-organic frameworks.

The present invention also provides a method for producing a metal-organic framework composite, including (b) subjecting a solution including a second metal precursor, a second organic ligand, a second organic solvent, and nano metal-organic frameworks to a hydrothermal reaction wherein the metal-organic framework composite includes a host metal-organic framework and nano metal-organic frameworks embedded in the host metal-organic framework, the second metal precursor is selected from Co, Fe, Cr, Zn, Al, Mg, Ni, En, Gd, and Tb precursors, the second organic ligand is selected from BDC, BTC, BTB, BBC, BTE, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADS, and BPP34C10DA, the second organic solvent is selected from dimethylformamide, diethylformamide, N-methyl-2-pyrrolidone, dimethyl sulfoxide, dimethylscelamide, methanol, ethanol, water, and mixtures thereof the host metal-organic framework and the nano metal-organic frameworks being represented by Formulae 1 and 2, respectively:

$$M1_{x1}O_{z1}(L1G1)_{y1} \quad (1)$$

$$M2_{x2}O_{x2}(L1G2)_{y2} \quad (2)$$

wherein M1 and M2 are different from each other and are each independently selected from Cu, Fe, Cr, Zn, Al, Mg, Ni, Eu, Gd, and Tb, L1G1 and L1G2 are different from each other and are each independently selected from BDC, BTC, BTB, BBC, BTE, BBEHPI, TATB, TPBTM, BIT, BTEI, BTTI, TTEI, BTETCA, BNETPI, BHEI, DOT, ATC, DCDPBN, ImDC, DPBPyDC, PPy, THBTS, ADB, and BPP34C10DA, x1 is an integer from 1 to 6, x2 is an integer from 1 to 6, z1 is an integer from 1 to 4, z2 is an integer from 0 to 4, y1 is an integer from 1 to 6, and y2 is an integer from 1 to 6.

The method further includes (a) mixing a first metal precursor, a first organic ligand, and a first organic solvent and reacting the mixture with stirring at room temperature to prepare the nano metal-organic frameworks wherein the first metal precursor is selected from Cu, Fe, Cr, Zn, Al, Mg, Ni, Eu, Gd, and Tb, the first organic ligand is selected from BDC, BTC, BTB, BBC, BTE, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADB, and BPP34C10DA, and the first organic, solvent is selected from dimethylformamide, diethylformamide, N-methyl-2-pyrrolidone, dimethyl sulfoxide, dimethylacetamide, methanol, ethanol, water, and mixtures thereof.

The method further includes activating the nano metal-organic frameworks and the host metal-organic framework in ethanol or chloroform as a solvent for 30 to 40 hours, followed by drying under vacuum at 100 to 120° C.

The first, metal precursor is a Cu precursor, the first organic ligand is BTC, the second metal precursor is a Zn precursor, the second organic ligand is BDC, the first organic solvent is a mixture of dimethylformamide, methanol, and water in a volume ratio of 0.7-1:0.7-1:0.7-1, and the second organic solvent is diethylformamide.

The Cu precursor and the BTC are in a weight ratio of 2.0-2.3:1.1-1.5.

The Zn precursor and the BDC are in a weight ratio of 17-18:3.5-4.0.

The hydrothermal reaction is carried out at 110 to 130° C. for 7 to 9 hours.

The present invention also provides a method for producing a dye-captured metal-organic framework composite, including (A) allowing a dye to be captured in nano metal-organic frameworks and (B) subjecting a solution of the dye-captured nano metal-organic frameworks, a second metal precursor, a second organic ligand, and a second organic solvent to a hydrothermal reaction wherein the second metal precursor is selected from Cu, Fe, Cr, Zn, Al, Mg, Ni, Eu, Gd, and Tb, the second organic ligand is selected from BDC, BTC, BTB, BBC, BTE, BHEHPI, TATB, TPBTM, BTP, BTEI, BTTI, TTEI, BTETCA, BNETPI, BHEI, DOT, ATC, DCDPBN, ImDC DPBPyDC, PPy, THBTS, ADB, and BPP34C10DA, and the second organic solvent is selected torn dimethylformamide, diethylformamide, N-methyl-2-pyrrolidone, dimethyl sulfoxide, dimethylacetamide, methanol, ethanol, water, and mixtures thereof.

As described above, the metal-organic framework composite of the present invention can be produced using a host metal-organic framework and nano metal-organic frameworks including different metals and organic ligands. The metal-organic framework composite has a structure in which the nano metal-organic frameworks are embedded in the host metal-organic framework. Due to this structure, defects are formed at the interfaces between the host metal-organic framework, and the nano metal-organic frameworks, enabling the application of the metal-organic framework composite to gas storages with greatly improved gas storage efficiency.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 8b shows a higher magnification image of FIG. 8a

DETAILED DESCRIPTION OF THE INVENTION

Several aspects and various embodiments of the present invention will now be described in more detail.

The present invention provides a metal-organic framework composite including a host metal-organic framework and nano metal-organic frameworks embedded in the host metal-organic framework, the host metal-organic framework and the nano metal-organic frameworks being represented by Formulae 1 and 2, respectively:

$$M1_{x1}O_{z1}(L1G1) \quad (1)$$

$$M2_{x2}O_{z2}(L1G2)_{y2} \quad (2)$$

wherein M1 and M2 are different from each other and are each independently selected from Cu, Fe, Cr, Zn, Al, Mg, Ni, Eu, Gd, and Tb, L1G1 and L1G2 are different from each other and are each independently selected from BDC, BTC, BTB, BBC, BTE, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADB, and BPP34C10DA, x1 is an integer from 1 to 6, x2 is an Integer from 1 to 6, z1 is an integer from 1 to 4, z2 is an integer from 0 to 4, y1 is an integer from 1 to 6, and y2 is m1 integer from 1 to 6. In the metal-organic framework composite of the present invention, the host metal-organic framework and the nano metal-organic frameworks Include different metals and organic ligands. The metal-organic framework composite of the present invention has excellent gas storage properties compared to the single use of the host metal-organic framework or the nano metal-organic frameworks.

In Formulae 1 and 2, M1 is Zn, L1G1 is BDC, M2 is Cu, L1G2 is BTC, x1 is 4, z1 is 1, y1 is 3, x2 is 3, z2 is 0, and y2 is 2. Particularly, the metal-organic framework composite has a high methane storage capacity of 197 mg/g, which corresponds to 250% of the volumetric capacity of a storage material commonly used in a compressed natural gas (CNG) tank at room temperature and 80 bar, when the host metal-organic framework is based on zinc and the nano metal-organic frameworks embedded in the host metal-organic framework is based on copper. This demonstrates superior gas storage capacity of the metal-organic framework composite according to the present invention, taking into consideration the fact that methane has a specific energy density as high as 15,400 Wh/kg.

The nano metal-organic frameworks have a size in the range of 5 to 300 nm. Outside this range, it is difficult for the nano metal-organic frameworks to form interfacial defects with the host metal-organic framework, which is disadvantageous in gas storage. Preferably, the nano metal-organic frameworks have a size of 5 to 100 nm.

The nano metal-organic frameworks have a pore size of 5 to 7 Å and the host metal-organic framework has a pore size of 8 to 10 Å. The nano metal-organic frameworks have a BET specific surface area similar to that of the host metal-organic framework, interestingly, the nano metal-organic frameworks and fee host metal-organic framework were confirmed to have different pore size distributions. The use of the metal-organic frameworks having different pore sizes for the production of the metal-organic framework composite facilitates the formation of defects at the interfaces between the host metal-organic framework and the nano metal-organic frameworks, leading to an improvement in gas storage capacity.

The nano metal-organic frameworks have a BET specific surface area, of 1370 to 1570 m²/g and the metal-organic framework composite has a BET specific surface area of 3300 to 3500 m²/g. A high BET specific surface area of the nano metal-organic frameworks is obtained when the pores are completely empty by activation during preparation. Considering the structure of the metal-organic framework composite in which the nano metal-organic frameworks are embedded in the host metal-organic framework, the metal-organic framework composite has a BET specific surface area similar to that of the host metal-organic framework.

L1G1 and L1G2 are in a molar ratio of 9-10:1. It is particularly preferred that the molar ratio of the organic ligand of the host metal-organic framework to the organic ligand of the nano metal-organic frameworks is 9.0-9.5:1. The molar ratio of the organic ligands contributes to a reduction in the pore size of the metal-organic framework composite, leading to an increase in specific surface area. As a result an increased amount of gas is adsorbed to the metal-organic frame work.

The present invention also provides a gas storage including the metal-organic framework composite. The metal-organic framework composite of the present invention has defects at the interfaces between the nano metal-organic frameworks and the host, metal-organic framework and a large specific surface area, achieving high gas storage capacity. Therefore, the metal-organic framework composite is very effective for gas storage when applied to a hydrogen, carbon dioxide or methane storage.

The present invention also provides a methane storage including the metal-organic framework composite. Particularly, the high methane (CH₄) uptake capacity of the metal-organic framework composite makes the methane storage very effective to store methane.

The present invention also provides a dye-captured metal-organic framework composite including (i) the metal-organic framework composite and (ii) a dye captured in the nano metal-organic frameworks. The nano metal-organic frameworks have the ability to encapsulate guest molecules, such as dye molecules. After encapsulation, the guest molecules can be embedded in the host metal-organic framework.

The present invention also provides a method for producing a metal-organic framework composite, including (b) subjecting a solution including a second metal precursor, a second organic ligand, a second organic solvent, and nano metal-organic frameworks to a hydrothermal reaction wherein the metal-organic framework composite includes a host metal-organic framework and nano metal-organic frameworks embedded in the host metal-organic framework, the second metal precursor is selected from Cu, Fe, Cr, Zn, Al, Mg, M, Eu, Gd, and Tb, the second organic ligand is selected from BDC, BTC, BTB, BBC, BTE, BHEHPI, TATB, TPBTM, BTP, BTEI, BTTI, TTEI, BTETCA, BNETPI, BBEI, DOT, ATC, DCDPBN, ImDC, DPBPyDC, PPy, THBTS, ADB, and BPP34C10DA, the second organic solvent is selected from dimethylformamide, diethylformamide, M-methyl-2-pyrrolidone, dimethyl sulfoxide, dimethylacetamide, methanol, ethanol, water, and mixtures thereof, the host metal-organic framework and the nano metal-organic frameworks being represented by Formulae 1 and 2, respectively:

$$M1_{x1}O_{z1}(L1G1)_{y1} \quad (1)$$

$$M2_{x2}O_{x2}(L1G2)_{y2} \quad (2)$$

wherein M1 and M2 are different from each other and are each independently-selected from Cu, Fe, Cr, Zn, Al, Mg, M, Eu, Gd, and Tb, L1G1 and L1G2 are different from each other and are each independently selected from BDC, BTC, BIB, BBC, BTE, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADB, and BPP34C10DA, x1 is an integer from 1 to 6, x2 is an integer from 1 to 6, z1 is an integer from 1 to 4, z2 is an integer from 0 to 4, y1 is an integer from 1 to 6, and y2 is an integer from 1 to 6. Conventional synthetic methods for embedding nanomaterials in metal-organic frameworks involve complicated processes, such as processes associated with the use of surfactants. In contrast, the method of the present invention involves very simple solvation, enabling efficient synthesis of a metal-organic framework composite.

The method further includes (a) mixing a first metal precursor, a first organic-ligand, and a first organic solvent and reacting the mixture with stirring at room, temperature to prepare the nano metal-organic frameworks wherein the first metal precursor is selected from Cu, Fe, Cr, Zn, Al, Mg, M, En, Gd, and Tb, the first organic ligand is selected from BDC, BTC, BTB, BBC, BTE, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADB, and BPP34C10DA, and the first organic solvent is selected from dimethylformamide, diethylformamide, N-methyl-2-pyrrolidone, dimethyl sulfoxide, dimethylacetamide, methanol, ethanol, water, and mixtures thereof. Unlike previously reported methods for synthesizing metal-organic frameworks, the method, of the present invention includes embedding nano metal-organic frameworks in a host metal-organic framework so that crystal lattice mismatch can occur at the interfaces between the nano metal-organic frameworks and the bulky host, metal-organic framework, leading to an improvement in gas storage properties.

The method further includes activating the nano metal-organic frameworks and the host metal-organic framework in ethanol or chloroform as a solvent for 30 to 40 hours, followed by drying under vacuum at 100 to 120° C. Particularly, the activation is performed to dissolve and remove residues in the pores of the metal-organic frameworks using the solvent. The empty spaces of the pores are filled with the solvent. The drying is performed to remove the solvent from the pores, leaving the pores completely empty.

The first metal precursor is a Cu precursor, the first organic ligand is BTC, the second metal precursor is a Zn precursor, the second organic ligand is BDC, the first organic solvent is a mixture of dimethylformamide, methanol and water in a volume ratio of 0.7-1:0.7-1:0.7-1, and the second organic solvent is diethylformamide. The use of the first organic solvent and the second organic solvent is more particularly preferred because high porosity of the metal-organic framework composite is obtained.

The Cu precursor and the BTC are in a weight ratio of 2.0-2.3:1.1-1.5 and the Zn precursor and the BDC are in a weight ratio of 17-18:3.5-4.0. When the weight ratios between the metal precursors and the organic ligands are within the respective ranges defined above, excellent cycle characteristics of the metal-organic frame work, composite can be ensured.

The hydrothermal reaction is carried out at 110 to 130° C. for 7 to 9 hours. The hydrothermal reaction may not be sufficiently carried out at a temperature lower than 110° C. Meanwhile, a hydrothermal reaction temperature higher than 130° C. may incur an increase in production cost. If the hydrothermal reaction time is shorter than 7 hours, the crystal phases of the metal-organic frameworks may not be well-defined. Meanwhile, if the hydrothermal reaction time is longer than 9 hours, the skeletal structures of the metal-organic frameworks may collapse.

The present invention also provides a method for producing a dye-captured metal-organic framework composite, including (A) allowing a dye to be captured in nano metal-organic frameworks and (B) subjecting a solution of the dye-captured nano metal-organic frameworks, a second metal precursor, a second organic ligand, and a second organic solvent to a hydrothermal reaction wherein the second metal precursor is selected from Cu, Fe, Cr, Zn, Al, Mg, Ni, Bu, Gd, and Tb, the second organic ligand is selected from BDC, BTC, BIB, BBC, BTB, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADB, and BPP34C10DA, and the second organic solvent is selected from dimethylformamide, diethylformamide, N-methyl-2-pyrrolidone, dimethyl sulfoxide, dimethylacetamide, methanol, ethanol, water, and mixtures thereof. According to the method of the present invention, nano metal-organic frameworks are allowed to capture dye molecules and the dye-captured nano metal-organic frameworks are then embedded in a host metal-organic framework to produce a dye-captured metal-organic framework composite, which can be applied to dye capture/storage technology.

Preparative Example 1

Preparation of Nano Metal-Organic Frameworks

Copper acetate monohydrate (215 mg) as a copper precursor and 1,3,5-benzenetricarboxylic acid (125 mg) as an organic ligand were dissolved in a mixture solution of dimethylformamide (DMF), ethanol, and distilled water (each 25 ml). The solution was allowed to react with stirring in a round bottom flask at room temperature to obtain a blue precipitate. After completion of the reaction, the precipitate was collected by centrifugation at 9000 rpm for 10 mm, washed with dimethylformamide and ethanol, immersed in ethanol for 3 days for activation, and dried in a vacuum oven at 100° C. for 24 h, giving nano metal-organic frameworks ("nHKUST-1").

Preparative Example 2

Preparation of Solution of Host Metal-Organic Framework

Zinc nitrate tetrahydrate (1764 mg) as a zinc precursor and 1,4-benzenedicarboxylic acid (375 mg) as an organic ligand were dissolved in 16 ml of dimethylformamide to prepare a solution of a host metal-organic framework ("MOF-5"). The nano metal-organic frameworks prepared in Preparative Example 1 were embedded in the zinc-based host metal-organic framework in the subsequent process.

Example 1

Synthesis of Metal-Organic Framework Composite

The host metal-organic framework, solution prepared in Preparative Example 2 was placed in a 30 ml vial. The nano metal-organic frameworks prepared in Preparative Example 1 were dispersed in 20 ml of dimethylformamide. 4 ml of the dispersion was added to the host metal-organic framework solution prepared in Preparative Example 2. The resulting mixture solution was initially opaque blue but turned transparent blue after sonication for 20 min. The solution was subjected to a hydrothermal reaction at 110° C. for 7 h. The obtained crystal was washed with dimethylformamide, immersed in chloroform for 3 days for activation, and dried in a vacuum oven at 120° C. for 24 h, giving a metal-organic framework composite ("nHKUST-1 ⊂ MOF-5").

Example 2

Synthesis of Metal-Organic Framework Composite_2

A metal-organic framework composite ("nHKUST-1⊂MOF-5_2") was synthesized in the same manner as in Example 1, except that 2 ml of the dispersion was added.

Figure 1A:
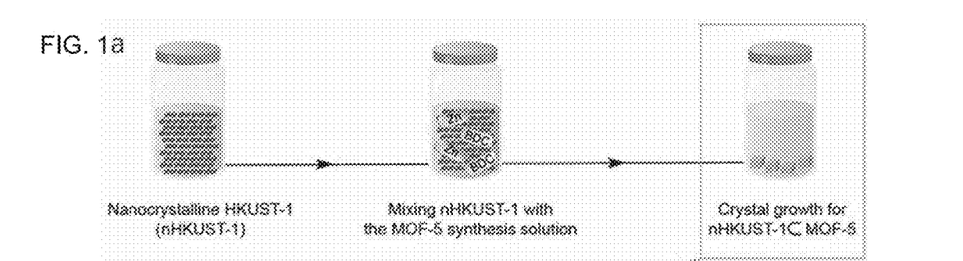
FIG. 1a is a diagram showing a procedure for producing a metal-organic framework composite through Preparative Examples 1 and 2.
Figure 1B:
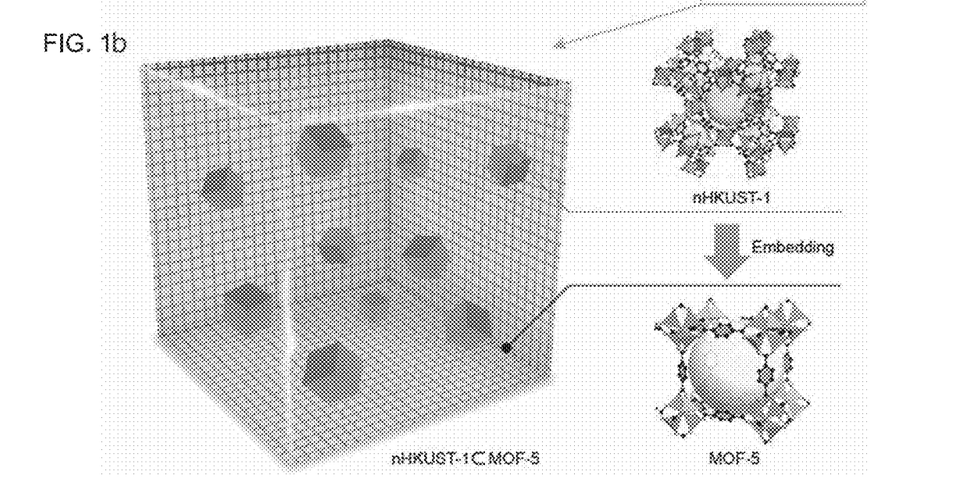
FIG. 1b shows the structure of a metal-organic framework composite synthesized in Example 1.

FIG. 1a is a diagram showing the procedure for producing the metal-organic framework composite through Preparative Examples 1 and 2 and FIG. 1b shows the structure of the metal-organic framework composite synthesized in Example 1. The mixture solution of the nano metal-organic frameworks prepared in Preparative Example 1 and the host metal-organic framework prepared in Preparative Example 2 was initially opaque by the suspended particles of the nano metal-organic frameworks prepared in Preparative Example 1 (see FIG. 1b). After the subsequent 20-min sonication, the mixture solution was changed to a transparent blue solution free of fine particles. The hydrothermal reaction of the transparent blue solution enabled the production of the metal-organic framework composite in which the nano metal-organic frameworks were embedded in the host metal-organic framework (see FIG. 1b).

Figure 2A:
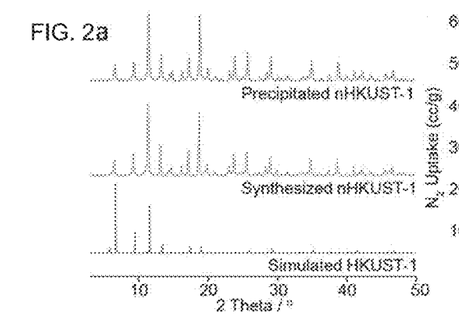
FIG. 2a shows a graph showing the X-ray diffraction (XRD) characteristics of nano metal-organic frameworks prepared in Preparative Example 1.
Figure 2B:
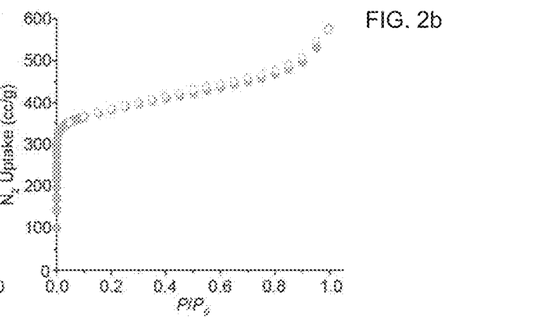
FIG. 2b is a graph showing the BET specific surface area ($N_2$ isothermal) of the nano metal-organic frameworks.
Figure 2C:
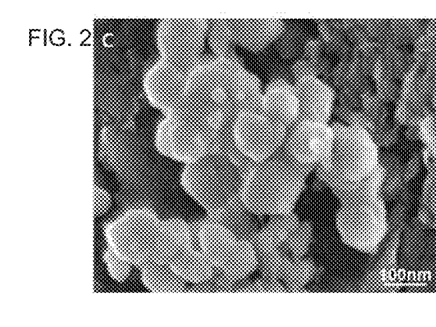
FIG. 2c shows a scanning electron microscopy (SEM) image of the nano metal-organic, frameworks.
Figure 2D:
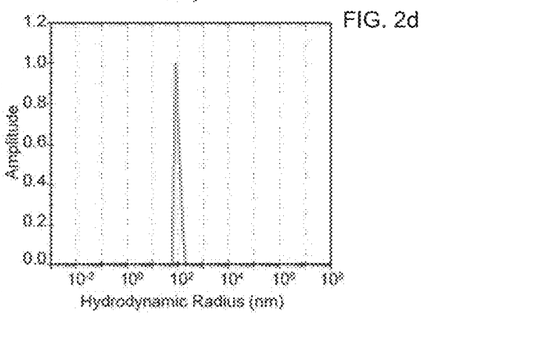
FIG. 2d shows a size distribution profile of the nano metal-organic frameworks, which was measured using dynamic light scattering (DLS)

FIG. 2a shows a graph showing the X-ray diffraction (XRD) characteristics of the nano metal-organic frameworks prepared in Preparative Example 1, FIG. 2b a graph showing the BET specific surface area ($N_2$ isothermal) of the nano metal-organic frameworks, FIG. 2c shows a scanning electron microscopy (SEM) image of the nano metal-organic frameworks, and FIG. 2d shows a size distribution profile of the nano metal-organic frameworks, which was measured using dynamic light scattering (DLS). As can be seen from FIG. 2a, a main peak of the nano metal-organic frameworks appeared at 2θ≤10°. The nano metal-organic frameworks were of Type 1 and had a specific surface area of about 1470 $m^2/g$, as determined by BET measurement using nitrogen (see FIG. 2b). The SEM image reveals that the nano metal-organic framework particles had a relatively uniform size of about 100 nm and were not separated from each other (see FIG. 2c). The size distribution profile of the nano metal-organic frameworks was measured using dynamic light scattering (DLS). As a result, the nano metal-organic frameworks were confirmed to have a uniform size of about 100 nm (see FIG. 2d).

Figure 3A:
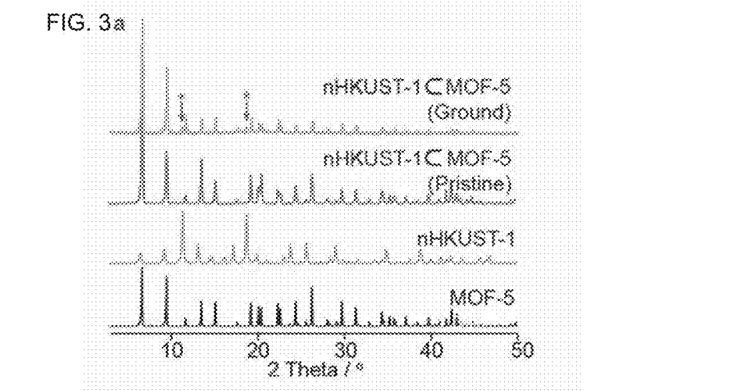
FIG. 3a is a graph showing the X-ray diffraction (XRD) characteristics of nano metal-organic frameworks prepared in Preparative Example 1, a host metal-organic framework prepared in Preparative Example 2, and a metal-organic framework composite synthesized in Example 1.
Figure 3B:
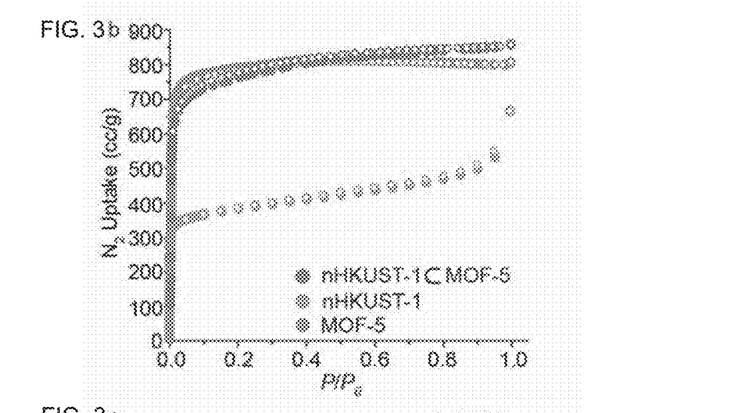
FIG. 3b is a graph showing the BET specific surface area ($N_2$ isothermal) of the nano metal-organic frameworks, the host metal-organic framework and the metal-organic framework composite.
Figure 3C:
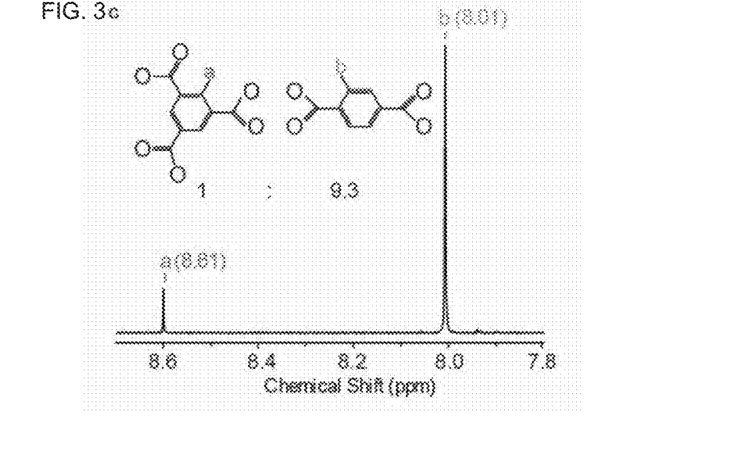
FIG. 3c shows a nuclear magnetic resonance (NMR) spectrum of the metal-organic framework composite.

FIG. 3a shows a graph showing the X-ray diffraction (XRD) characteristics of the nano metal-organic frameworks prepared in Preparative Example 1, the host metal-organic framework prepared in Preparative Example 2, and the metal-organic framework composite synthesized in Example 1, FIG. 3b is a graph showing the BET specific surface area ($N_2$ isothermal) of the nano metal-organic frameworks, the host metal-organic framework, and the metal-organic framework composite, and FIG. 3c shows a nuclear magnetic resonance (NMR) spectrum, of the metal-organic framework composite. In FIG. 3a, the XRD patterns of the nano metal-organic frameworks (nHKUST-1), the host metal-organic framework (MOF-5), the pristine metal-organic framework composite (nHKUST-1⊂MOF-5 (Pristine)), and the metal-organic framework composite in the form of a powder (nHKUST-1⊂MOF-5 (Ground)) are shown from the bottom. The diffraction peaks of the host metal-organic framework (MOF-5) appeared at the same 2θ angles as those of the pristine metal-organic framework composite (nHKUST-1⊂MOF-5 (Pristine)) and the metal-organic framework composite in the form of a powder (nHKUST-1⊂MOF-5 (Ground)). In contrast the diffraction peaks of the nano metal-organic frameworks (nHKUST-1) did not appear in the pristine metal-organic framework composite (nHKUST-1⊂MOF-5 (Pristine)) and were observed in the metal-organic framework composite in the form of a powder (nHKOST-1⊂CMOF-5 (Ground)). These results demonstrate that the nano metal-organic frameworks (nHKUST-1) were embedded in the host metal-organic framework (MOF-5) rather than supported on the host metal-organic framework (MOF-5).

From FIG. 3b, it can be confirmed that the metal-organic framework composite in which the nano metal-organic structures were embedded in the host metal-organic framework had a specific surface area of 3400 $m^2/g$, which was not significantly different from that of the host metal-organic framework in which the nano metal-organic structures were not embedded.

From the NMR spectrum, the organic ligand of the nano metal-organic frameworks and the organic ligand of the host metal-organic frame work were detected at 8.6 ppm and 8.01 ppm, respectively, demonstrating that their molar ratio was 1:9.3 (see FIG. 3c). The molar ratio indicates that 11 wt % of the nano metal-organic frameworks were embedded in the host metal-organic framework. The results of inductively coupled plasma atomic emission spectroscopy (ICP-AES) for the metals of the nano metal-organic frameworks (Cu, 10 wt %) and the host metal-organic framework (Zn, 90 wt %) also reveal that 1.1 wt % of the nano metal-organic frameworks were embedded in the host metal-organic framework.

Figure 4:
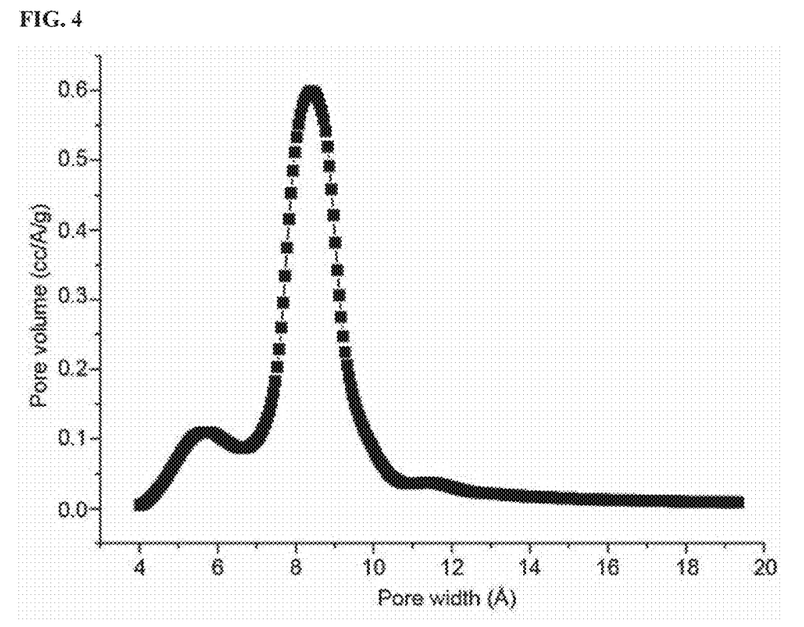
FIG. 4 shows a pore size distribution profile of a metal-organic framework composite synthesized in Example 1.

FIG. 4 is a pore size distribution profile of the metal-organic framework composite synthesized in Example 1. The BET specific surface area of the metal-organic framework composite was similar to that of the host metal-organic framework (see FIG. 3b), but the nano metal-organic frameworks and the host metal-organic framework, were confirmed to have pore sizes of 6 Å and 9 Å, respectively (see FIG. 4).

Figure 5:
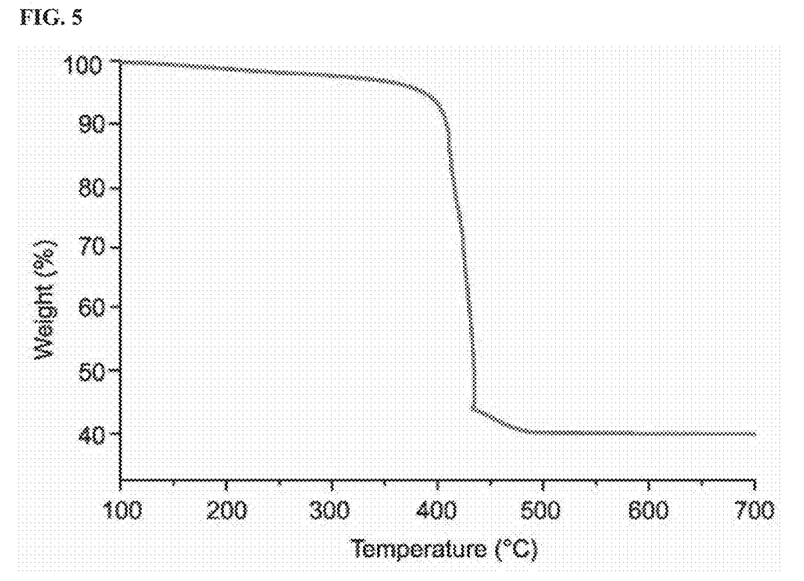
FIG. 5 shows a thermogravimetric analysis (TGA) curve of a metal-organic framework composite synthesized in Example 1.

FIG. 5 is a themiogravimetric analysis (TGA) curve of the metal-organic framework composite synthesized in Example 1. The results of TGA show that the metal organic-framework composite was thermally stable at 400° C. or less.

Figure 6A:
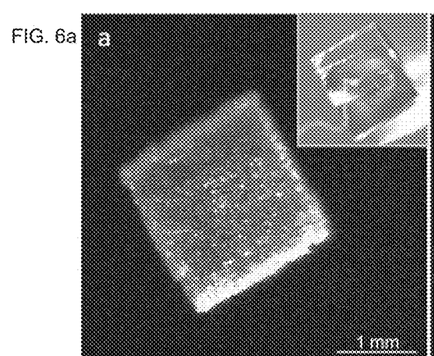
FIG. 6a shows an optical microscopy image of a metal-organic framework composite synthesized in Example 1, which was measured in bright/dark field mode.
Figure 6B:
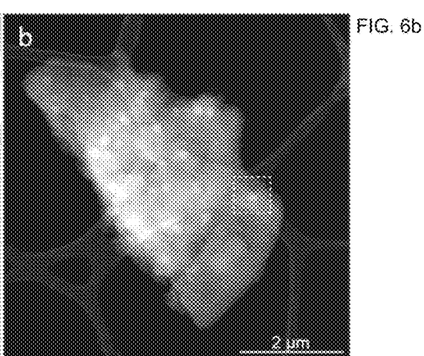
FIG. 6b shows a scanning transmission electron microscopy (STEM) image of the metal-organic framework composite.
Figure 6C:
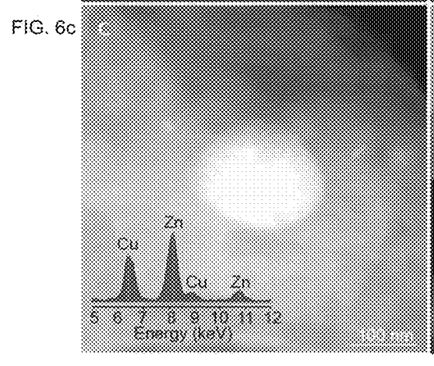
FIG. 6c shows a higher magnification high-angle annular dark field scanning transmission electron microscopy (HAADF STEM) image of 2b.
Figure 6D:
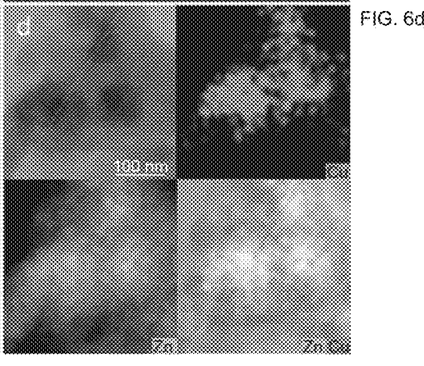
FIG. 6d shows mapping images of the metal-organic framework composite.

FIG. 6a shows an optical microscopy image of the metal-organic framework composite synthesized in Example 1, which was measured in bright/dark field mode, FIG. 6b shows a scanning transmission electron microscopy (STEM) image of the metal-organic framework composite, FIG. 6c shows a higher magnification high-angle annular dark field scanning transmission electron microscopy (HAADF STEM) image of FIG. 6b, and FIG. 6d shows mapping images of the metal-organic framework composite. FIG. 6a shows that the nano metal-organic frameworks were embedded in the host metal-organic framework and FIG. 6b shows that the embedded nano metal-organic frameworks appeared brighter than the host metal-organic framework. FIG. 6c shows the detection of zinc from the host metal-organic framework (8.2 and 10.8 keV) and copper from the nano metal-organic frameworks (6.4 and 8.9 keV). The results of mapping for the metal-organic framework composite show that the domains were divided depending on the kinds of metals (see FIG. 6d. Particularly, the interfaces between the embedded nano metal-organic frameworks and the host metal-organic framework were well-defined (see FIG. 6c). The formation of defects at the interfaces leads to an improvement in the gas storage properties.

Figure 7:
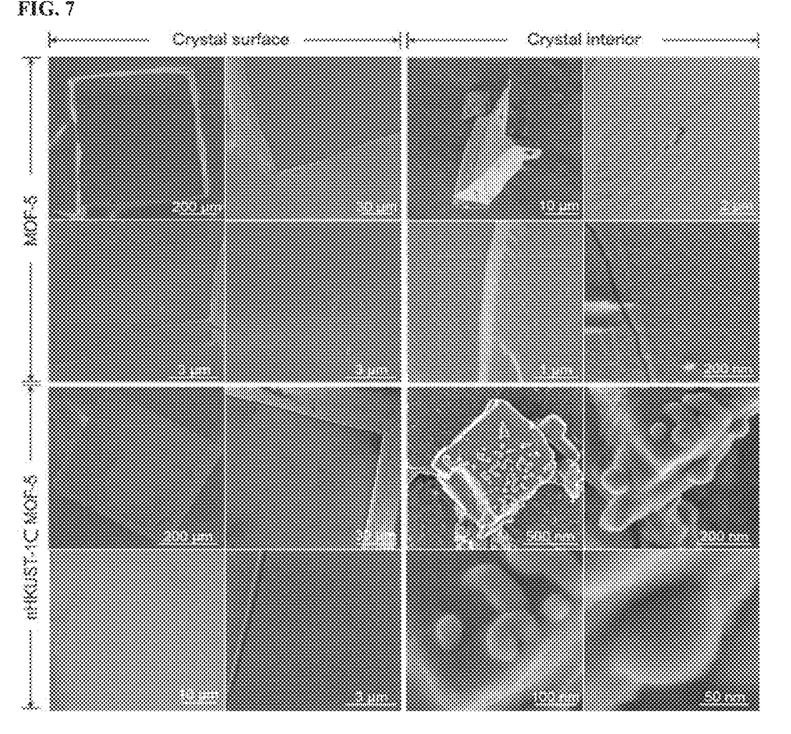
FIG. 7 shows scanning electron microscopy (SEM) images of the crystal surfaces and crystal interiors of a host metal-organic framework prepared in Preparative Example 2 and a metal-organic framework synthesized in Example 1.

FIG. 7 shows scanning electron microscopy (SEM) images of the crystal surfaces and crystal interiors of the host metal-organic framework prepared in Preparative Example 2 and the metal-organic framework synthesized in Example 1. The images of the interiors of the metal-organic framework composite show the presence of the nano metal-organic frameworks having a size of 100 nm. The surface images show that the surfaces of the metal-organic framework composite and the host metal-organic framework were smooth.

Figure 8A:
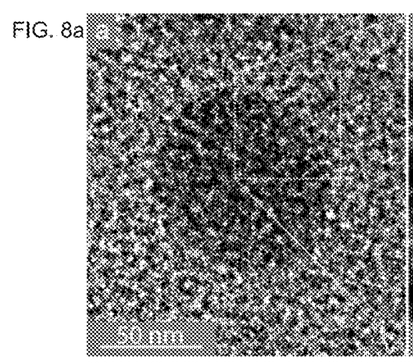
FIG. 8a shows a high-resolution transmission electron microscopy (HRTEM) image of a randomly selected point of a metal-organic framework composite synthesized in Example 1.
Figure 8B:
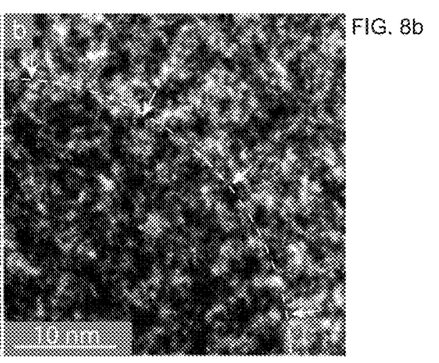
Figure 8C:
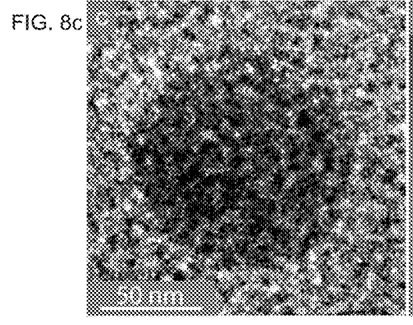
FIG. 8c shows a another high-resolution transmission electron microscopy (HRTEM) image of a randomly selected point of a metal-organic framework composite synthesized in Example 1.
Figure 8D:
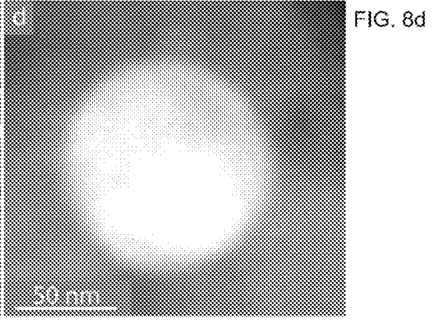
FIG. 8d shows a high-angle annular dark field scanning transmission electron microscopy (HAADF STEM) image of FIG. 8c.

FIGS. 8a and 8c show high-resolution transmission electron microscopy (HRTEM) images of two randomly selected points of the metal-organic framework composite synthesized in Example 1, FIG. 8b shows a higher magnification image of FIG. 9a, and FIG. 8d shows a high-angle annular dark field scanning transmission electron microscopy (HAADF STEM) image of FIG. 8c. In FIG. 8a and FIG. 8c, the central dark portions are the nano metal-organic frameworks and the circumferential portions represent the host metal-organic framework. FIG. 8a and FIG. 8d show that, there were no gaps between the host metal-organic framework and the nano metal-organic frameworks, which indicates that the host metal-organic framework was in direct contact with the nano metal-organic frameworks at their interfaces. It was confirmed that the formation of the specific interfaces led to an improvement in gas adsorption performance.

Figure 9A:
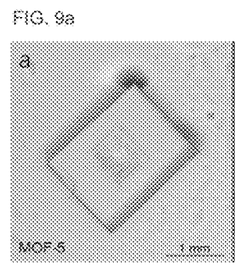
FIG. 9a shows a confocal microscopy image of a host metal-organic framework prepared in Preparative Example 2.
Figure 9B:
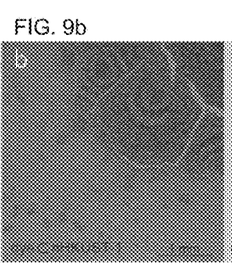
FIG. 9b shows a confocal microscopy image of a state in which Rhodamine dye was embedded in the pores of nano metal-organic frameworks prepared in Preparative Example 1.
Figure 9C:
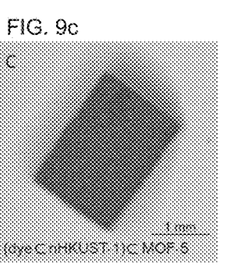
FIG. 9c shows a confocal microscopy image of a structure in which the Rhodamine dye-embedded nano metal-organic frameworks were embedded in the host metal-organic framework.

FIG. 9a shows a confocal microscopy image of the host metal-organic framework prepared in Preparative Example 2, FIG. 9b shows a confocal microscopy image of a state in which Rhodamine dye was embedded in the pores of the nano metal-organic, frameworks prepared in Preparative Example 1, and FIG. 9c shows a confocal microscopy image of a structure in which the Rhodamine dye-embedded nano metal-organic frameworks were embedded in the host metal-organic framework. The host metal-organic framework was not photosensitized, as shown in FIG. 9a, but the Rhodamine dye was embedded in the host metal-organic framework, as confirmed in FIGS. 9b and 9c.

Figure 10A:
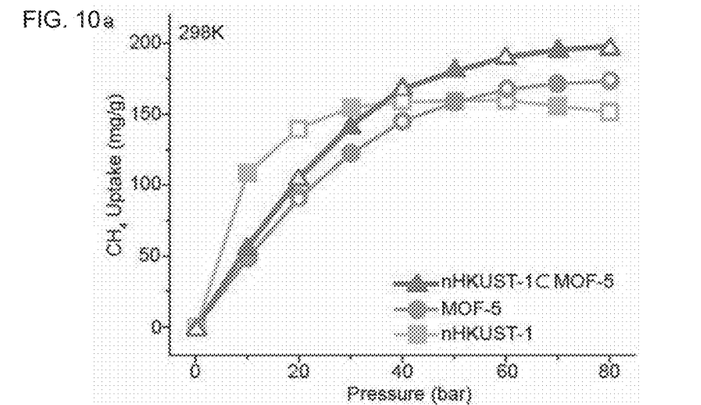
FIG. 10a shows a graph comparing the methane ($CH_4$) uptake capacities of nano metal-organic frameworks prepared in Preparative Example 1, a host metal-organic framework prepared in Preparative Example 2, and a metal-organic framework composite synthesized in Example 1.
Figure 10B:
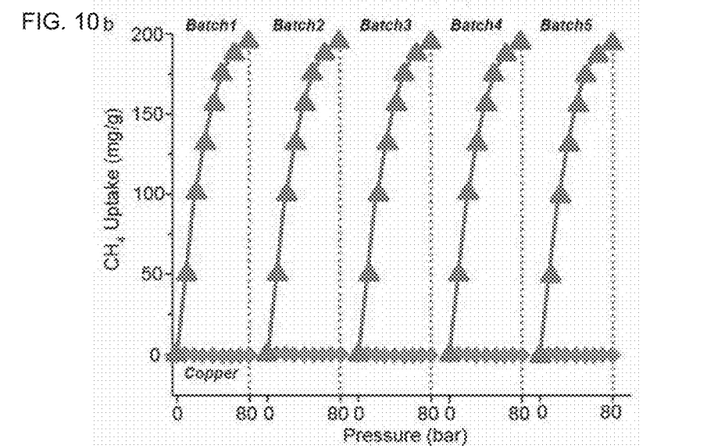
FIG. 10b shows a graph comparing the characteristics of the metal-organic framework composite grown in different vials (baths)
Figure 10C:
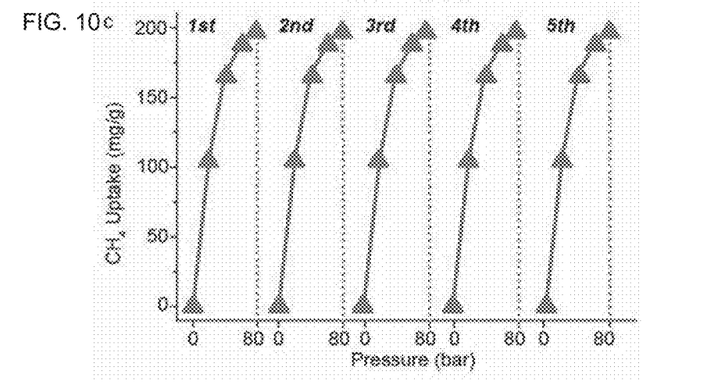
FIG. 10c is a graph showing the cycle characteristics of the metal-organic framework composite.

FIG. 10a shows a graph comparing the methane ($CH_4$) uptake capacities of the nano metal-organic frameworks prepared in Preparative Example 1, the host metal-organic framework prepared in Preparative Example 2, and the metal-organic framework composite synthesized in Example 1, FIG. 10b shows a graph comparing the characteristics of the metal-organic framework composite grown in different vials (baths), and FIG. 10c shows a graph showing the cycle characteristics of the metal-organic framework composite. The methane uptake capacities shown in FIG. 10a were measured using a magnetic suspension balance (MSB, Rubotherm). The methane uptake capacities of the metal-organic framework composite were found to be higher by 14% and 36% than those of the nano metal-organic frameworks and the host metal-organic framework, respectively (see FIG. 10a). As can be seen from FIG. 10b, the same methane uptake results (197 mg/g) were obtained in the metal-organic framework composite grown in different vials (baths), demonstrating their generality. The methane sorption cycle characteristics of the metal-organic framework composite were measured at room temperature (see FIG. 10c), confirming that the metal-organic framework composite had superior cycle performance, high reversible capacity, and good stability.

Figure 11:
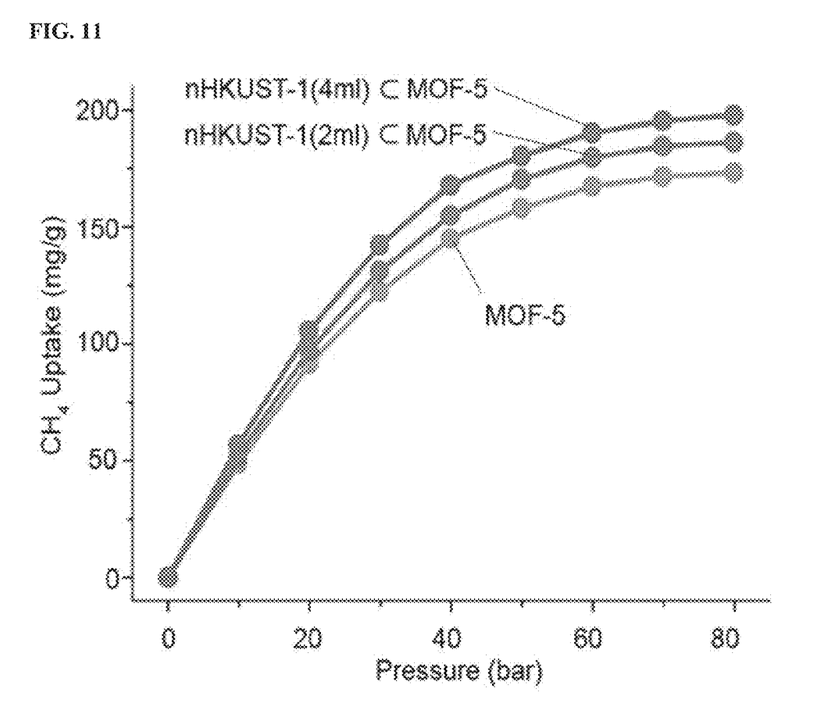
FIG. 11 shows a graph comparing the methane ($CH_4$) uptake capacities of a host metal-organic framework (MOF-5) prepared in Preparative Example 2, a metal-organic framework composite (nHKUST-1(4 ml) ⊂ MOF-5) synthesized in Example 1, and a metal-organic framework composite_2 (nHKUST-1(2 ml) ⊂ MOF-5) synthesized in Example 2.

FIG. 11 is a graph comparing the methane ($CH_4$) uptake capacities of the host metal-organic framework (MOF-5) prepared in Preparative Example 2, the metal-organic framework composite (nHKUST-1(4 ml)⊂MOF-5) synthesized in Example 1, and the metal-organic framework composite_2 (nHKUST-1(2 ml)⊂MOF-5) synthesized in Example 2. As can be seen from FIG. 11, the methane uptake capacity was improved with increasing amount of the nano metal-organic frameworks embedded in the host metal-organic framework.

What is claimed is:

1. A metal-organic framework composite comprising a host metal-organic framework and nano metal-organic frameworks embedded in the host metal-organic framework, the host metal-organic framework and the nano metal-organic frameworks being represented by Formulae 1 and 2, respectively:

(1)

(2)

wherein M1 and M2 are different from each other and are each independently selected from Cu, Fe, Cr, Zn, Al, Mg, Nis Eu, Gd, and Tb, L1G1 and L1G2 are different from each other and are each independently selected from BDC, BTC, BTB, BBC, BTE, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADB, and BPP34C10DA, x1 is an integer from 1 to 6, x2 is an integer from 1 to 6, z1 is an integer from 1 to 4, z2 is an integer from 0 to 4, y1 is an integer from 1 to 6, and y2 is an integer from 1 to 6.

2. The metal-organic framework composite according to claim 1, wherein M1 is Zn, L1G1 is BDC, M2 is Cu, L1G2 is BTC, x1 is 4, z is 1, y1 is 3, x2 is 3, z2 is 0, and y2 is 2.

3. The metal-organic framework composite according to claim 1, wherein the nano metal-organic frameworks have a size of 5 to 300 nm.

4. The metal-organic framework composite according to claim 1, wherein, the nano metal-organic frameworks have a pore size of 5 to 7 Å and the host metal-organic framework has a pore size of 8 to 10 Å.

5. The metal-organic framework composite according to claim 1, wherein the nano metal-organic frameworks have a BET specific surface area of 1370 to 1570 m²/g and the metal-organic framework composite has a BET specific surface area of 3300 to 3500 m²/g.

6. The metal-organic framework composite according to claim 1, wherein L1G1 and L1G2 are in a molar ratio of 9-10:1.

7. A gas storage comprising the metal-organic framework composite according to claim 1.

8. A methane storage comprising the metal-organic framework composite according to claim 1.

9. A dye-captured metal-organic framework composite comprising (i) the metal-organic framework composite according to claim 1, and (ii) a dye captured in the nano metal-organic frameworks.

10. A method for producing a metal-organic framework composite, comprising (b) subjecting a solution comprising a second metal precursor, a second organic ligand, a second organic solvent, and nano metal-organic frameworks to a hydrothermal reaction wherein the metal-organic framework composite comprises a host metal-organic framework and nano metal-organic frameworks embedded in the host metal-organic framework, the second metal precursor is selected from Cu, Fe, Cr, Zn, At, Mg, Ni, Eu, Gd, and Tb precursors, the second organic ligand is selected from BDC, BTC, BTB, BBC, BTB, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADB, and BPP34C10DA, the second organic solvent is selected from dimethylformamide, diethylformamide, N-methyl-2-pyrrolidone, dimethyl sulfoxide, dimethylacetamide, methanol, ethanol, and mixtures thereof, and optionally further comprising water, the host metal-organic framework and the nano metal-organic frameworks being represented by Formulae 1 and 2, respectively:

$$M1_{x1}O_{z1}(L1G1)_{y1} \quad (1)$$

$$M2_{x2}O_{z2}(L1G2)_{y2} \quad (2)$$

wherein M1 and M2 are different from each other and are each independently selected from Cu, Fe, Cr, Zn, Al, Mg, Ni, Eu, Gd, and Tb, L1G1 and L1G2 are different from each other and are each independently selected from BDC, BTC, BTB, BBC, BTE, BHEHPI, TATB, TPBTM, BTP, BTEI, BTTI, TTBI, BTETCA, BNETPI, BHEI, DOT, ATC, DCDPBN, ImDC DPB-PyDC, PPy, THBTS, ADB, and BPP34C10DA, x1 is an integer from 1 to 6, x2 is an integer from 1 to 6, z1 is an integer from 1 to 4, z2 is an integer from 1 to 4, y1 is an integer from 1 to 6, and y2 is an integer from 1 to 6.

11. The method according to claim 10, further comprising (a) mixing a first metal precursor, a first organic ligand, and a first organic solvent and reacting the mixture with stirring at room temperature to prepare the nano metal-organic frameworks wherein the first metal precursor is selected from Cu, Fe, Cr, Zn, Al, Mg, Ni, Eu, Gd, and Tb, the first organic ligand is selected from BDC, BTC, BTB, BBC, BTE, BHEHPI, TATB, TPBTM, BTP, BTEI, BTTI, TTEI, BTETCA, BNETPI, BHEI DOT, ATC, DCDPBN, ImDC, DPBPyDC, PPy, THBTS, ADB, and BPP34C10DA, and the first organic solvent is selected from dimethylformamide, diethylformamide, N-methyl-2-pyrrolidone, dimethyl sulfoxide, dimethylacetamide, methanol, ethanol, and mixtures thereof, and optionally further comprising water.

12. The method according to claim 10, further comprising activating the nano metal-organic frameworks and the host metal-organic framework in ethanol or chloroform as a solvent for 30 to 40 hours, followed by drying under vacuum at 100 to 120° C.

13. The method according to claim 10, wherein the first metal precursor is a Cu precursor, the first organic ligand is BTC, the second metal precursor is a Zn precursor, the second organic ligand is BDC, the first organic solvent is a mixture of dimethylformamide, methanol, and water in a volume ratio of 0.7-1:0.7-1:0.7-1, and the second organic solvent is diethylformamide.

14. The method according to claim 13, wherein the Cu precursor and the BTC are in a weight ratio of 2.0-2.3:1.1-1.5.

15. The method according to claim 13, wherein the Zn precursor and the BDC are in a weight ratio of 17-18:3.5-4.0.

16. The method according to claim 10, wherein, the hydrothermal reaction is carried out at 110 to 130° C. for to 9 hours.

17. A method for producing a dye-captured metal-organic framework composite, comprising (A) allowing a dye to be captured in nano metal-organic frameworks and (B) subjecting a solution of the dye-captured nano metal-organic frameworks, a second metal precursor, a second organic ligand, and a second organic solvent to a hydrothermal reaction wherein the second metal precursor is selected from Cu, Fe, Cr, Zn, Al, Mg, Ni, Bu, Gd, and Tb, the second organic ligand is selected from BDC, BTC, BTB, BBC, BTE, BHEHPI, TATB, TPBTM, BTP, BTEI, BTTI, TTEI, BTETCA, BNETPI, BHEI, DOT, ATC, DCDPBN, ImDC, DPBPyDC, PPy, THBTS, ADB, and BPP34C10DA, and the second organic solvent is selected from dimethylformamide, diethylformamide, N-methyl-2-pyrrolidone, dimethyl, sulfoxide, dimethylacetamide, methanol, ethanol, and mixtures thereof, and optionally further comprising water.

* * * * *